Oct. 28, 1969    J. R. HARDER    3,474,591
AUTOMATIC PACKAGING APPARATUS WITH REMOVABLE DIE COVERING
Filed May 2, 1966    2 Sheets-Sheet 1
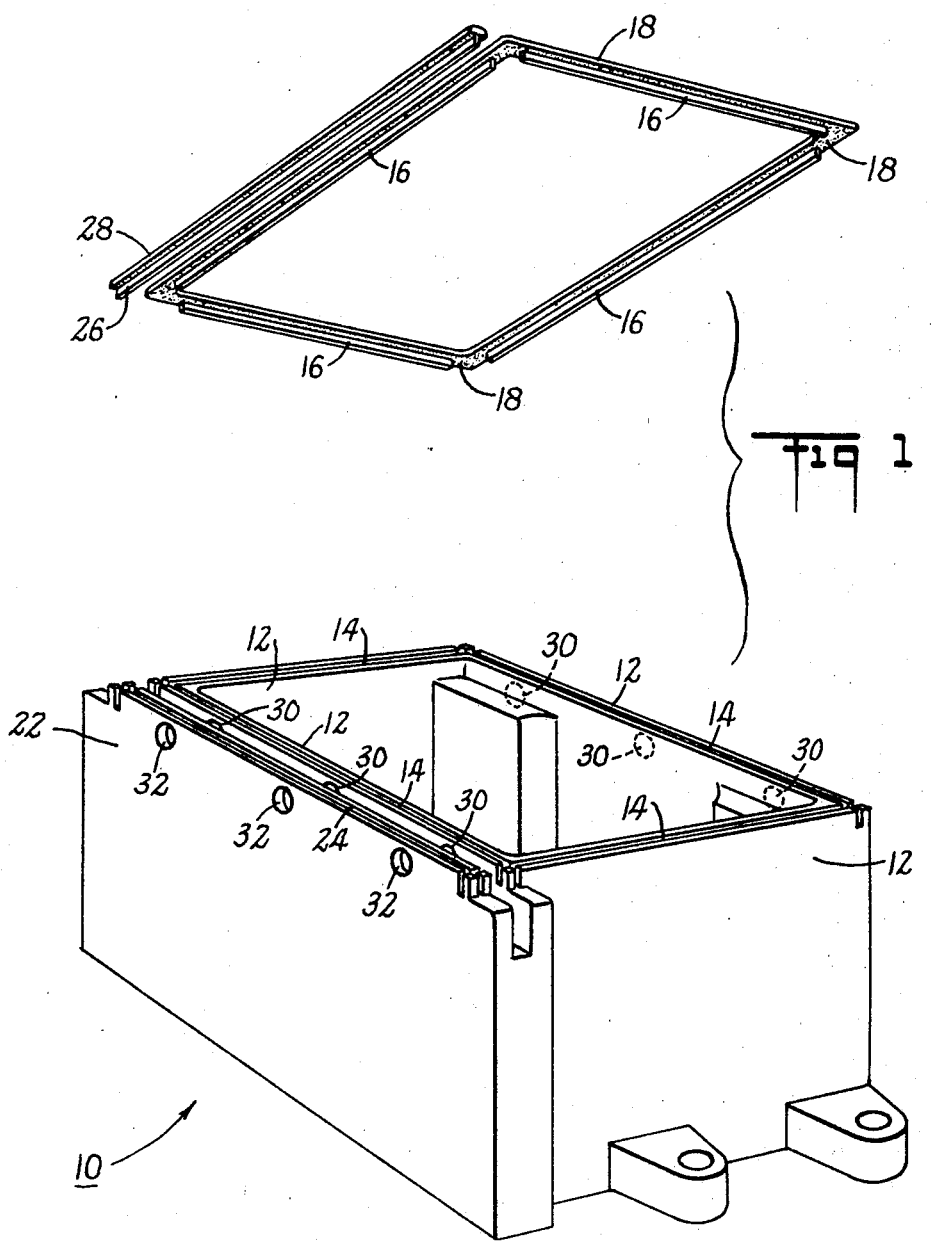
INVENTOR
John R. Harder
BY
Curtis Morris + Safford
ATTORNEYS Oct. 28, 1969  J. R. HARDER  3,474,591
AUTOMATIC PACKAGING APPARATUS WITH REMOVABLE DIE COVERING
Filed May 2, 1966  2 Sheets-Sheet 2
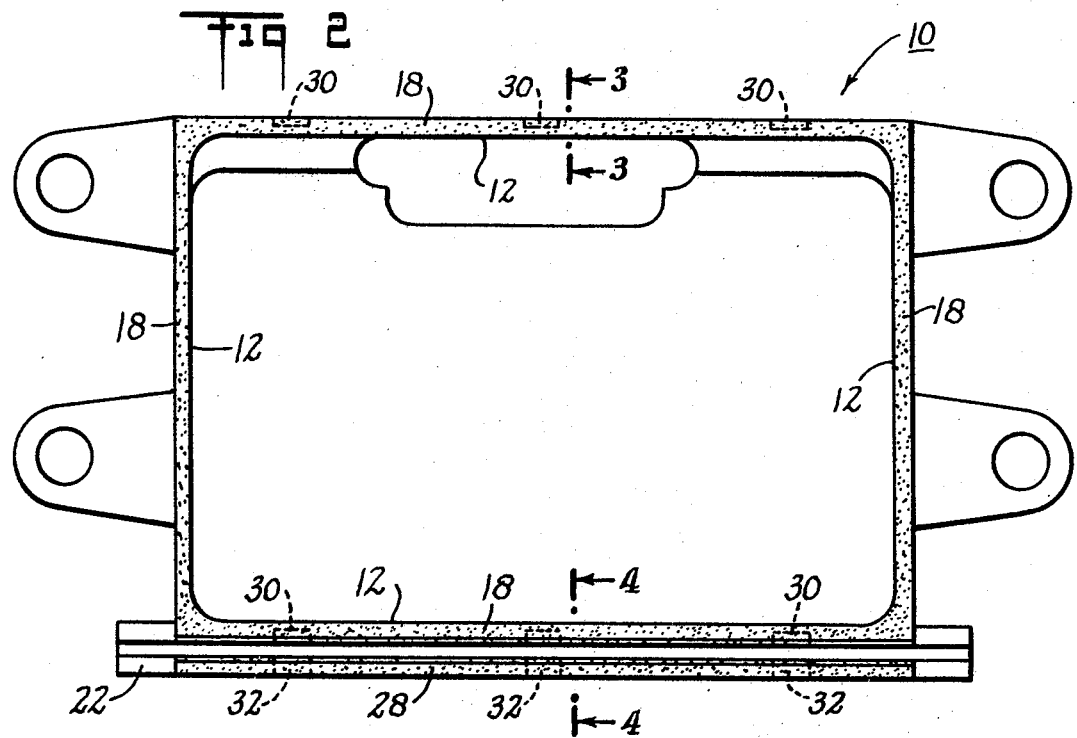
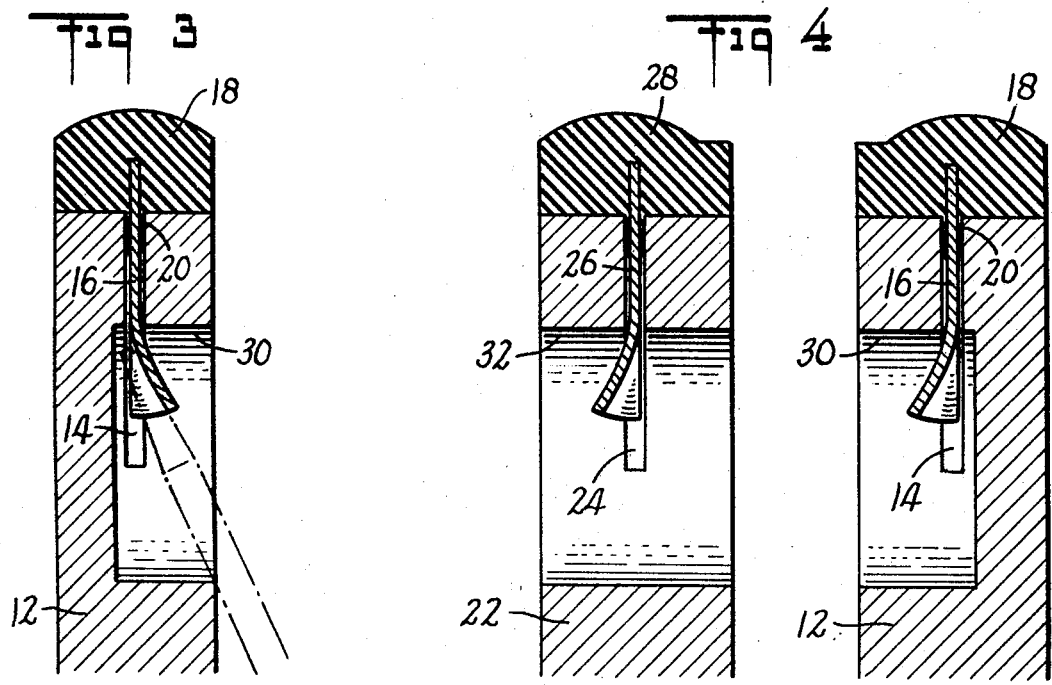

United States Patent Office 3,474,591
Patented Oct. 28, 1969

3,474,591
AUTOMATIC PACKAGING APPARATUS WITH
REMOVABLE DIE COVERING
John R. Harder, Cedar Grove, N.J., assignor to Mahaffy
& Harder Engineering Company, Totowa, N.J.
Filed May 2, 1966, Ser. No. 546,766
Int. Cl. B65d 53/00; B65b 31/02
U.S. Cl. 53—112                                 7 Claims

ABSTRACT OF THE DISCLOSURE

A packaging die carrying a removable resilient cover for evacuation or heat-sealing purposes. The cover is molded to thin flexible metal strips which fit in slots in the die walls to aid in providing proper placement and in holding the strips in position while allowing the entire die cover unit to be easily and rapidly replaced.

This invention relates to automatic packaging apparatus. More particularly, this invention relates to such apparatus which is adapted to form air-tight evacuated packages from continuous sheets of plastic packaging film.

Automatic packaging machines to form sealed and evacuated packages containing various products, such as luncheon meat and frankfurters, have gone into widespread use commercially. A particularly successful machine of this class is described in U.S. Patent 3,125,839. That machine consists of a large number of dies in the form of individual trays mounted on an endless chain for intermittent indexing movement past a series of operating stations, where certain sequential packaging procedures are carried out.

At one of these operating stations, a thin sheet of plastic film is applied to the top of the trays and is stretched down into the tray cavity by vacuum to form a partial package section in the nature of a cup-shaped receptacle. This package section then is loaded with the desired product. At a subsequent station (sometimes referred to as the preliminary seal station), a second sheet of plastic film is applied to the top of the tray and is heat-sealed to the first film at the marginal-edges around the periphery of the tray cavity. At the next station (sometimes referred to as the final seal station), the package is evacuated through an opening in the film, and the opening then is closed off to make a hermetically sealed evacuated package.

Each of the package-forming trays is covered with a resilient material, such as silicone rubber, extending entirely around the periphery of the tray cavity on top of the side walls. This resilient material serves as a heat-sealing backup while the tray is engaged by the heated seal bars at the preliminary seal station, and also serves as a gasket to prevent leakage of air into the trays during the subsequent evacuation at the final seal station. Generally, this resilient covering material is vulcanized directly onto the trays in order to effect a firm long-lasting bond.

Ordinarily, the resilient tray covering will serve without failure for a reasonably long time. However, not infrequently the covering will become damaged due to mistreatment, or deteriorate because of environmental conditions. In that event, the defective tray typically must be returned to the manufacturer for recovering by the special vulcanizing process. This is a relatively costly operation because the techniques are complicated and require highly skilled personnel.

More recently, there has been introduced a packaging machine containing essentially only a single die which is used for both heat-sealing and evacuating each package. This single die is engaged once each operating cycle by cooperating parts of the machine (i.e. the sealing head comprising the heat-seal bars), and thus its resilient covering is subjected to substantially greater wear than in the multiple-tray machines. For example, in a typical machine having 45 trays, each tray would be engaged by the heat-seal bars only once every 45 cycles. Consequently, it will be evident that for the single-die machine the wear of the resilient covering is significantly more severe than in the multiple-die machines, and the problem of replacement is correspondingly more critical.

It has been recognized that the problem of replacing defective die coverings would be greatly alleviated if the covering could be made readily removable and replaceable by relatively unskilled personnel in the field. Various attempts have been made to devise suitable die covering arrangements having such characteristics, so as to avoid the need of returning the die to the manufacturer each time the covering becomes defective and requires replacement. However, none of these attempts has satisfactorily solved the problem.

It is a principal object of this invention to provide such a resilient die-covering arrangement wherein the resilient material can readily be removed and replaced by relatively unskilled personnel, thus enabling the die to be retained at the place of use during repair of a defective or worn out cover. Other objects, aspects and advantages of the invention will in part be pointed out in, and in part apparent from, the following description considered together with the accompanying drawings in which:

FIGURE 1 is an exploded perspective view of a packaging machine die with resilient die-covering in accordance with this invention;

FIGURE 2 is a plan view of the die of FIGURE 1; and

FIGURES 3 and 4 are detail sections taken respectively along lines 3—3 and 4—4 of FIGURE 2, particularly to show the manner in which the die-covering is held in place with respect to vertical movement.

Referring now to FIGURE 1, there is shown a package-forming die 10 of the type adapted to receive a rectangular cup-shaped package section loaded with product such as a stack of luncheon meat or frankfurters. The manner in which this die is used to make a completely sealed and evacuated package is described in detail in copending application Ser. No. 526,081, filed by Joel A. Hamilton on Feb. 9, 1966, and reference also may be made to that copending application for information on the overall functioning of a packaging machine which employs a die of this type.

In brief, the packaging machine described in the above-mentioned application receives a continuous web or sheet of plastic packaging film from a roll and vacuum-forms this film into a series of cup-shaped partial package sections, receptacles) which are conveyed with an intermittent indexing motion to an operating station where they are loaded with product. A second sheet of plastic packaging film is placed across the opening of each partial package section to serve as a top therefor, and the loaded package sections are further indexed to a position above the die 10. The die then is moved up to a position surrounding the package with the die walls engaging the flat side marginal portions of the package. Simultaneously, a sealing head (not shown herein) descends to press heated sealing bars against the marginal portions of the package section to seal the two sheets of film together around the margins. The interior of the package then is evacuated through an opening inboard of the marginal seals, and the evacuation opening is closed off to complete the hermetic sealing of the evacuated package.

Turning now to the present invention, it will be seen that the die 10 comprises four side walls 12 and a bottom defining a generally rectangular cavity. The exposed end (top) surfaces of these walls are milled to provide narrow (e.g. .014" wide) slots 14 running the full length of each wall and centrally located between the opposite sides of the walls. These slots are shaped to receive respective metal anchor strips 16, e.g. of relatively soft bendable brass, which are molded together with a resilient cover 18 arranged in the form of a beading and made, for example of silicone rubber.

As shown in FIGURES 3 and 4, the resilient cover 18 has a width equal to that of the land defined by the corresponding wall 12 which, in a commercial machine, typically might have a dimension of 5/32". Each brass strip 16 fits relatively snugly into its slot 14. Any flashing 20 produced during the molding process extends only part way down the strip, and is sufficiently thin not to interfere with vertical motion of the strip within its slot.

The die 10 also may include an additional wall 22 defining a sealing surface which functions in a special manner described in the above-identified copending application. The top of this wall 22 similarly is formed with a milled slot 24 to receive an anchor strip 26 molded with a separate resilient cover 28 and corresponding in construction to the resilient cover for the main four walls 12 of the die.

At all of the walls 12 and 22, the respective strips 16 and 26 serve to anchor the molded resilient covers 18 and 28 with respect to lateral movement, and assure that these covers remain exactly aligned, to the required degree, with the associated end surfaces of the walls. When the sealing clamp (not shown) presses the margins of the package against the upper surfaces of the covers 18 and 28, the pressure of engagement jams the covers firmly down against the die walls to make an air-tight seal around the periphery of the die cavity. Thus rapid and proper evacuation of the package in the die can be achieved.

It will be apparent that the resilient covers 18 and 28 can readily be secured to the die walls, simply by inserting the strips 16 and 26 into the corresponding slot 14 and 24. Alignment of the covers with the walls is automatically effected as a result of the construction arrangement employed, so that there is no need for using highly skilled personnel for securing the die covers in place. A special advantage of this arrangement is that the dimensions of the die lands (i.e. the top surfaces of the die walls) can be the same as in dies covered by conventional vulcanizing processes; thus, the feature of ready removal and replacement of the die covers does not entail the consumption of any additional packaging film.

Although the die 10 may never be turned upside down in the operation of the packaging machine, it is desirable to provide positive means for holding the anchor strips 16 and 26 in place vertically. For this purpose, the walls 12 and 22 are formed respectively with spaced holes 30 and 32 which extend inwardly to communicate with the slots 14 and 24 and provide access to the lower end of the anchor strips 16 and 26 therein. By inserting a tool such as a screwdriver in these holes (as illustrated in FIGURE 3), the lower end of the strip can be bent a small amount outwardly, just sufficient to restrain and prevent any upward movement of the strip and resilient cover molded thereto. When it is desired to remove the cover, the strip can readily be re-bent to a vertical position, thereby freeing the cover for removal and replacement.

When the sealing clamp with its heat-seal bars (not shown) engages the die 10, the pressure exerted against the resilient covers 18 and 28 naturally tends to compress the rubber material. In accordance with one aspect of the present design, this compression is effective across the entire width of the resilient cover because the slots 14 and 24 are deeper than the corresponding strip 16 and 26 and therefore the strip merely moves down slightly further into the slot during compression. This feature tends to assure good vacuum sealing around the die cavity while providing good dispersion of the compressive energy throughout the rubber material.

From the above description, it will be apparent that the present invention provides a significant improvement in the construction of packaging dies carrying a resilient cover for evacuation or heat-sealing purposes. The cover can be furnished as an integral unit which can be installed quickly and simply by unskilled personnel. In operation, it provides the requisite sealing and compressive characteristics needed for successful vacuum packaging operations. When worn out, it can readily be removed and replaced by a new unit, without the loss of any significant "down time" of the packaging machine, and will provide good air-tight seals without the need for special adjustments or highly skilled attention.

Although a specific preferred embodiment of the invention has been disclosed and described hereinabove in detail, it is desired to emphasize that this is for the purpose of illustrating the invention so that others may adapt it to other embodiments as may be required by particular applications; the disclosure herein therefore should not be construed in a limiting sense except as required by the prior art.

What is claimed is:

1. In automatic packaging apparatus of the type including a die comprising wall means defining a cavity arranged to receive plastic material formed into a cup-shaped container having around the mouth thereof flanges which rest on the end surfaces of said wall means, wherein a package top of plastic material is positioned over said container mouth overlying said flanges to be sealed thereto by a sealing clamp arranged to press the plastic material of the top and container cup flange tightly together against the end surfaces of said die walls to establish a hermetic seal entirely around said cup mouth while the package is evacuated, said die end surfaces being provided with a resilient cover to be engaged by the plastic material of the container cup for producing a hermetic seal with the plastic material of said container;

wherein the improvement comprises: anchoring means for said resilient cover to hold it detachably in place at the end surfaces of said die, there being no adhesive bond between said end surfaces and the resilient cover so as to permit ready removal of said cover from the die, said anchoring means consisting of at least one anchoring element secured to said resilient cover and extending downwardly away from the bottom region thereof which is adjacent said wall means end surfaces, the width of said anchoring element in a lateral direction with respect to said wall means being less than the width of said resilient cover in said lateral direction and also less than the width of said wall means, there being a portion of said resilient cover directly engaging said die end surfaces along a closed path extending entirely around said cup mouth to effect a tight seal between the resilient cover and the end surfaces when under compressive engagement from the pressure of said sealing clamp, said wall means end surfaces being formed with an opening shaped to receive said anchoring element, said wall means further being formed with portions to engage corresponding sides of said anchoring element and prevent lateral movement thereof so as to retain said resilient cover laterally in place while permitting the desired rapid removal and replacement of said cover when required, said receiving opening having a depth at least substantially as great as the vertical length of said anchoring element so that said resilient cover portion can be freely compressed against said wall means end surface around said closed path to effect the desired sealing engagement between said die and said resilient cover during evacuation of a package.

2. In automatic packaging apparatus of the type including a die comprising wall means defining a cavity arranged to receive plastic material formed into a cup-shaped container having around the mouth thereof flanges which rest on the end surfaces of said wall means, the apparatus further being of the type having means for applying to said container while in said cavity a package top of plastic material overlying said cup flanges and adapted to be sealed thereto, said apparatus further being of the type having a sealing clamp arranged to press the plastic material of the top and container cup flange tightly together against the end surfaces of said die walls to establish a hermetic seal entirely around said cup mouth, said end surfaces being provided with a resilient cover to be engaged by the plastic material of the container cup for producing said hermetic seal with the plastic material of said container, said apparatus further being of the type having means for evacuating the package interior while the container cup is in said cavity;

wherein the improvement comprises: anchoring means for said resilient cover to hold it detachably in place at the end surfaces of said die, there being no adhesive bond between said end surfaces and the resilient cover so as to permit ready removal of said cover from the die, said anchoring means consisting of at least one anchoring element secured to said resilient cover and extending downwardly away from the bottom region thereof which is adjacent said wall means end surfaces, the width of said anchoring element in a lateral direction with respect to said wall means being less than the width of said resilient cover in said lateral direction and also less than the width of said wall means, there being a portion of said resilient cover directly engaging said die end surfaces along a closed path extending entirely around said cup mouth to effect a tight seal between the resilient cover and the end surfaces when under compressive engagement from the pressure of said sealing clamp, said wall means end surfaces being formed with an opening shaped to receive said anchoring element, said wall means further being formed with portions both inboard and outboard of said opening to engage corresponding sides of said anchoring element and prevent lateral movement thereof so as to retain said resilient cover laterally in place while permitting the desired rapid removal and replacement of said cover when required, said receiving opening having a depth at least substantially as great as the vertical length of said anchoring element so that said resilient cover portion can be freely compressed against said wall means end surface around said closed path to effect the desired sealing engagement between said die and said resilient cover during evacuation of a package.

3. Apparatus as claimed in claim 1, wherein said anchoring means includes a part integral with said anchoring element and extending upward into the interior of said resilient cover to a terminating position a substantial distance above the interface between said resilient cover portion and said die end surface, said part serving to secure said anchoring means to said resilient cover, said terminating position of said part being below the top surface of said resilient cover so as to permit uninterrupted sealing engagement between said top surface and the flanges of said cup-shaped container.

4. Apparatus as claimed in claim 1, wherein said wall means defines a cavity adapted to receive a package having marginal portions overlaying said end surfaces, said resilient cover being a unitary part extending uninterruptedly around the periphery of said cavity, said anchoring means comprising a plurality of elements depending from said cover at spaced positions around said periphery.

5. Apparatus as claimed in claim 1, wherein said anchoring element is a thin strip of metal and said element-receiving opening is an elongate slot extending parallel to said wall means.

6. Apparatus as claimed in claim 5, including means to hold said strip in said slot.

7. Apparatus as claimed in claim 6, wherein said wall means is formed on the outer side thereof adjacent said strip with at least one hole communicating with said slot, said strip having a length sufficient to extend down to the region of junction between said slot and said hole, said strip being deformed laterally in the region of said hole to secure said strip from movement out of said slot.

References Cited

UNITED STATES PATENTS

| | | | |
|---|---|---|---|
| 1,998,366 | 4/1935 | Geyer. | |
| 3,260,032 | 7/1966 | Hill et al. | 53—112 |
| 3,343,333 | 9/1967 | Mahaffy et al. | 53—112 |

TRAVIS S. McGEHEE, Primary Examiner

U.S. Cl. X.R.

18—19; 220—9, 46